United States Patent
Wolf et al.

(10) Patent No.: US 10,064,097 B2
(45) Date of Patent: Aug. 28, 2018

(54) INTERFACE SHAPING FOR VIRTUAL INTERFACES

(71) Applicant: Apple Inc., Cupertino, CA (US)

(72) Inventors: Andreas Wolf, San Carlos, CA (US); Lawrie Kurian, San Jose, CA (US); Saravanan Balasubramaniyan, Los Gatos, CA (US); Tashbeeb Haque, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 23 days.

(21) Appl. No.: 15/173,426

(22) Filed: Jun. 3, 2016

(65) Prior Publication Data

US 2016/0360446 A1    Dec. 8, 2016

Related U.S. Application Data

(60) Provisional application No. 62/171,807, filed on Jun. 5, 2015.

(51) Int. Cl.
| | |
|---|---|
| *H04W 28/08* | (2009.01) |
| *H04W 72/12* | (2009.01) |
| *H04W 72/04* | (2009.01) |
| *H04W 92/10* | (2009.01) |
| *H04W 88/06* | (2009.01) |

(52) U.S. Cl.
CPC ....... *H04W 28/08* (2013.01); *H04W 72/1263* (2013.01); *H04W 72/0446* (2013.01); *H04W 88/06* (2013.01); *H04W 92/10* (2013.01)

(58) Field of Classification Search
CPC . H04W 28/08; H04W 72/1263; H04W 88/06; H04W 92/10; H04W 72/0446
See application file for complete search history.

(56) References Cited

U.S. PATENT DOCUMENTS

| | | | |
|---|---|---|---|
| 7,068,623 B1* | 6/2006 | Barany | H04W 72/1284 370/329 |
| 7,283,487 B2 | 10/2007 | Wu | |
| 7,688,784 B2 | 3/2010 | Bitran et al. | |
| 7,724,683 B2 | 5/2010 | Moratt et al. | |
| 7,944,895 B2 | 5/2011 | Danielson et al. | |
| 8,358,629 B2 | 1/2013 | Grilli et al. | |
| 8,483,236 B2 | 7/2013 | Moratt et al. | |
| 8,776,090 B2* | 7/2014 | Elzur | G06F 9/45537 719/324 |
| 2003/0110173 A1* | 6/2003 | Marsland | G06F 9/45533 |
| 2008/0181252 A1* | 7/2008 | Rofougaran | H04L 12/40013 370/451 |
| 2008/0186933 A1 | 8/2008 | Willman et al. | |
| 2011/0075589 A1 | 3/2011 | Bradley et al. | |
| 2011/0125905 A1 | 5/2011 | Baucke et al. | |
| 2012/0315853 A1 | 12/2012 | Lambert | |
| 2013/0217359 A1 | 8/2013 | Cherian et al. | |
| 2013/6019499 | 8/2013 | Dayal et al. | |

(Continued)

*Primary Examiner* — Min Jung
(74) *Attorney, Agent, or Firm* — Dickinson Wright RLLP

(57) ABSTRACT

Disclosed herein are systems, methods, and non-transitory computer-readable storage media for allocating bandwidth on a physical wireless interface. The method includes configuring a first virtual interface and a second virtual interface on the physical wireless interface. A requirement associated with the first virtual interface is monitored and one or more time slots are allocated to the first virtual interface in accordance with the requirement.

20 Claims, 5 Drawing Sheets

(56) References Cited

U.S. PATENT DOCUMENTS

| | | |
|---|---|---|
| 2013/0308475 A1 | 11/2013 | Celebi et al. |
| 2014/0108584 A1* | 4/2014 | Lu .......................... H04L 47/76 709/208 |
| 2014/0161024 A1 | 6/2014 | Speight et al. |
| 2014/0192669 A1 | 7/2014 | Wang et al. |
| 2014/0293848 A1 | 10/2014 | Varney |
| 2014/0362728 A1 | 12/2014 | Krochmal et al. |
| 2014/0366105 A1 | 12/2014 | Bradley et al. |
| 2015/0016265 A1 | 1/2015 | Ahmadi |
| 2016/0034287 A1* | 2/2016 | Shah .................. G06F 9/45558 718/1 |
| 2016/0286576 A1* | 9/2016 | Zander .................... H04W 4/06 |

* cited by examiner

INTERFACE SHAPING FOR VIRTUAL INTERFACES

CROSS REFERENCE TO RELATED APPLICATION

This application claims benefit of U.S. Provisional Patent Application No. 62/171,807 filed on Jun. 5, 2015 and entitled "Interface Shaping for Virtual Interfaces," the contents of which are hereby incorporated by reference in its entirety.

TECHNICAL FIELD

The present technology pertains to managing virtual interfaces, including allocating bandwidth to virtual interfaces that share a physical communications interface.

BACKGROUND

Modern mobile devices typically include support for one or more wireless protocols that permit the device to simultaneously connect to various networks as well as to other devices. A physical interface in the device can provide for communication in accordance with the wireless protocol. For example, a physical Wi-Fi interface on a device can provide for communication to a Wi-Fi infrastructure network by associating with an access point or it can provide for communication with other devices that support peer-to-peer connectivity.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A physical wireless interface on a device can have the capability to support multiple virtual interfaces. When multiple virtual interfaces share the same physical interface, the performance of each of the virtual interfaces can be monitored and the available bandwidth can be dynamically allocated between the virtual interfaces. Disclosed are systems, methods, and non-transitory computer-readable storage media for shaping a physical interface by allocating bandwidth resources to virtual interfaces that share the physical interface based at least in part on different parameters or requirements associated with the respective virtual interfaces.

One aspect of the present technology involves a method for allocating bandwidth to virtual interfaces that share a physical interface. A first virtual interface and a second virtual interface can each be configured on a physical interface that has a plurality of available time periods, e.g., organized as slots, windows, frames, etc. In some embodiments, the physical interface comprises a single radio and configuring multiple virtual interfaces includes allocating radio resources (channel medium time) to each of the multiple virtual interfaces. In some embodiments, the physical interface can be a Wi-Fi module configured to transmit and receive data over a Wi-Fi network. The physical interface can be associated with a first virtual interface, e.g., that can correspond to an infrastructure Wi-Fi network interface, and a second virtual interface, e.g., that can correspond to a peer-to-peer connection. A first requirement associated with the first virtual interface can be obtained and monitored, and a second requirement associated with the second virtual interface can also be obtained and monitored. Based on the first requirement and/or the second requirement, the available slots can be allocated between the first virtual interface and the second virtual interface. In some embodiments, the first and second requirements can include a number of data packets or a number of bytes queued in a transmission buffer. In further embodiments the first and second requirements can include a class of service requirement. In still further embodiments, the first or second requirements can be obtained from an application that is utilizing one of the virtual interfaces. Further, each of the first requirement and the second requirement can represent an individual requirement or a set of requirements having multiple factors.

Another aspect of the present technology involves a non-transitory computer-readable storage medium that has instructions that cause a processor to allocate bandwidth to virtual interfaces that share a physical interface. A first virtual interface and a second virtual interface can each be configured on a physical interface that has a plurality of available slots. In some embodiments, more than two virtual interfaces can be defined. A first set of time slots can be allocated to the first virtual interface and a second set of time slots can be allocated to the second virtual interface. A requirement associated with the first virtual interface can be obtained and monitored. Based on the requirement, one or more remaining time slots can be allocated to the first virtual interface. In some embodiments, a change in the requirement can be detected that corresponds to an increase or a decrease in demand for bandwidth. In response to the change, the time slots can be reallocated among the virtual interfaces, e.g., the first virtual interface and the second virtual interface.

A further aspect of the present technology involves a client device for allocating bandwidth to virtual interfaces that share a physical interface. The client device can have a processor and a computer-readable medium with instructions stored thereon that cause the processor to perform certain operations. The processor can configure a first virtual interface and a second virtual interface on a physical wireless interface that has a plurality of time slots. The processor can monitor a first requirement associated with the first virtual interface and allocate, based on the first requirement, time slots to the first virtual interface. The processor can monitor a second requirement associated with the second virtual interface and allocate time slots to the second virtual interface accordingly. The processor can dynamically change the allocation of time slots between the first and second virtual interfaces based on changes to the first and second requirements.

When multiple virtual interfaces share a physical interface, balancing the time or bandwidth that the physical interface provides to each virtual interface improves overall performance. In some embodiments, a Wi-Fi radio is used for both infrastructure Wi-Fi and peer-to-peer communication. The time allocated to each by the physical interface is a decision, in some embodiments, that is based on requirements of each virtual interface. In some embodiments, the decision is made in real time based on measurements and/or parameters of the virtual interfaces.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION

Figure 1:
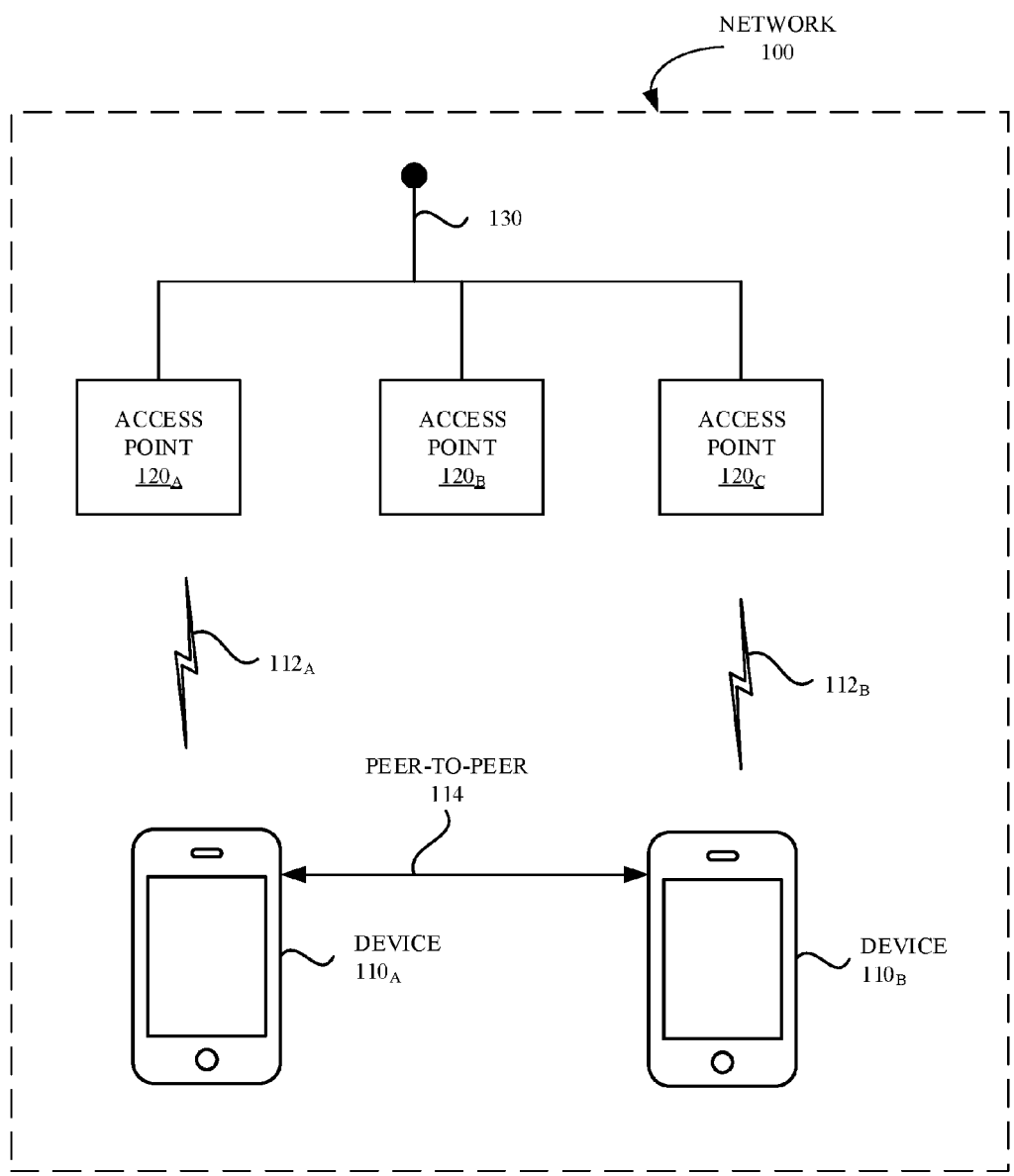
FIG. 1 illustrates an example wireless network configuration.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for shaping a physical interface to accommodate virtual interfaces. In particular, the present technology is directed to systems, methods, devices, and non-transitory computer-readable storage media for allocating bandwidth to two or more virtual interfaces that share a physical interface. The bandwidth is allocated to the virtual interfaces based on requirements, characteristics, and/or parameters associated with the corresponding virtual interfaces. An interface, in some embodiments, is a set of rules including signal formats that allow one module to communicate with another module. Data provided by an application, in some embodiments, is stored in a buffer for transmission over the interface. For the other direction, incoming data received over the interface is stored in a receive buffer before consumption by the application. A single radio can be used to service, e.g., two transmission buffers (and two receive buffers). For example, the radio can serve one transmit buffer and then the other transmit buffer in a time division manner. To an application using the first transmit buffer, the arrangement of the first transmit buffer and the single radio below to something referred to as a virtual interface. The application is unaware of a second transmit buffer also using the single radio. The single radio provides a wireless interface. In some embodiments, more than two virtual interfaces can be defined.

The controlling entity that coordinates the servicing of the buffers and the single radio can be referred to as an interface shaping engine. The interface shaping engine monitors the first and second application and the first and second transmit buffers. Monitoring includes determining when a given buffer is becoming full and/or when an oldest packet in a given buffer has attained an age equal a threshold, where the threshold indicates that the age of the packet is approaching or has reached a maximum quality of service delay time associated with the first application.

In some embodiments, communication by a device with a Wi-Fi radio occurs over a Wi-Fi protocol and over AWDL/ NAN protocol. NAN (Neighbor Awareness Networking) focuses communication among devices in close proximity. If the Wi-Fi application is idle, then the peer-to-peer application can be given all or most of the bandwidth over the Wi-Fi radio. In some embodiments, when the Wi-Fi application is idle, the Wi-Fi radio shifts to another radio channel to support the AWDL application. This shift can lead to operation over a channel with less radio traffic and thus less interference for the AWDL communication. In determining how much time or bandwidth to allocate to each of the Wi-Fi application and the AWDL application, the interface shaping engine can take into account any or all of the type of traffic (e.g. QoS) in a data flow, the characteristic of the traffic (e.g., burstiness vs. trickle data), and external factors, such as channel utilization by other transmitters. Burstiness is the intermittent increase or decrease in the activity of traffic. Some applications, for example, AirPlay® Mirroring on the peer-to-peer interface, benefit from as few channel switches as possible. When such an application is present, the interface shaping engine will favor not switching the channel as long as the Wi-Fi application can tolerate the delay (e.g., bursty data).

The characteristic of a data flow to and from the device, in some embodiments, is described by a traffic specification (TSPEC). Traffic, or a traffic stream, in some embodiments, is a set of MAC service data units (MSDUs) to be delivered subject to the QoS parameter values in a particular TSPEC.

Prior to discussing the present technology in detail, a brief introductory description of an exemplary configuration of devices and a network is disclosed herein. A detailed description of the various aspects of the present technology will then follow. These variations will be described herein as the various embodiments are set forth.

Turning now to FIG. 1, a block diagram of an example network 100 is depicted. Network 100 is an embodiment of a network that is configured to support wireless communication between network components. In the illustrated embodiment, network 100 includes wireless devices $110_A$ and $110_B$, wireless access points $120_A$, $120_B$, $120_C$ and a wired network 130. An access point is an entity that contains a STA and provides access to distribution of services via a wireless medium and associated STAs. A STA is a logical entity that is an addressable instance of a MAC (medium access control) and PHY (physical layer) interface to a wireless medium.

Wireless devices 110 may be any type of suitable device. Devices 110 may, for example, include desktop personal computers, laptops, workstations, net tops, mobile phones, personal data assistants, tablet devices, music players, wearable devices, I/O devices such as monitors, televisions, touch screens, digital cameras, scanners, video recorders, video players, etc. In some embodiments, wireless devices 110 are configured to implement one or more of the Institute of Electrical and Electronic Engineers (IEEE) 802.11 standards (such as 802.11a, b, g, n, ac, and ax) in order to establish a wireless connection $112_A$ or $112_B$ with an access point 120. In some embodiments, wireless devices may support other wireless standards such as IEEE 802.15 standards (e.g., Bluetooth®, ZigBee, etc.), cellular standards (e.g., Universal Mobile Telecommunications System (UMTS), Evolution-Data Optimized (EV-DO), Long Term Evolution (LTE), etc.), etc. In further embodiments, wireless devices 110 can be configured to implement peer-to-peer connections such as peer-to-peer connection 114 between device $110_A$ and device $110_B$. Examples of the peer-to-peer connection 114 can include a WI-FI-DIRECT connection or an Apple Wireless Direct Link (AWDL) as developed by Apple Inc. from Cupertino, Calif.

Access points 120, in some embodiments, are configured to facilitate communication between wireless devices 110 and wired network 130. Accordingly, access points 120 may be configured to communicate over one or more wireless channels corresponding to different respective frequencies e.g., channels associated with 2.4 GHz and 5 GHz bands. Access points 120 may also support multiple transmission rates, various encryption standards, frequency hopping, etc. In some embodiments, access points 120 are members of the same extended service set (ESS); in some embodiments, access points 120 are associated with the same service set identifier (SSID). An ESS is the union of infrastructure BSSs with the same SSID connected by a DS. A DS (distribution system) is an IEEE 802.11 architectural component that interconnects infrastructure BSSs. Although, in the illustrated embodiment, access points 120 are shown as being coupled to the same wired network 130, in some embodiments, access points 120 may be associated with separate unrelated networks.

Wired network 130 may correspond to any suitable wired network. Accordingly, in some embodiments, network 130 is a local area network (LAN). Network 130 may include switches, routers, or other wired devices. In some embodiments, network 130 may include one or more gateways to facilitate communication with a wide area network (WAN) such as the Internet.

In various embodiments, access points 120 are configured to transmit beacon frames to wireless devices 110 to facilitate communication with devices. Access points 120 may transmit beacon frames as part of a periodic broadcast such as transmitting a beacon frame every 100 ms. A wireless device 110 may thus receive the beacon frame by monitoring the wireless channel that the beacon frame is transmitted over.

Wireless devices 110 may use beacon frames to negotiate and establish a connection 112. In some embodiments, wireless devices 110 use beacon frames to facilitate roaming—e.g., a wireless device 110 may transition from one access point 120 to another access point 120 based on signals strengths of beacon frames, supported transmission rates specified in beacon frames, utilization of a given access point 120 as indicated in beacon frames, etc. In some embodiments, wireless devices 110 are further configured to use beacon frames to facilitate positioning of devices 110 within an area—e.g., a device 110 having a knowledge of where access points 120 are located may be configured to determine its location based on received signal strength indicators (RSSI) for beacon frames received from access points 120.

In various embodiments, devices 110 are configured to establish and maintain peer-to-peer connection 114 by utilizing the Wi-Fi (802.11) interface. Accordingly, devices 110 can simultaneously maintain infrastructure wireless network connectivity via connection 112 and peer-to-peer connectivity to another device 110 via connection 114 by using a single physical Wi-Fi transceiver. The simultaneous connections can be established on device 110 by utilizing virtual interfaces that share the physical interface. The physical interface can be shared among the various virtual interfaces according to their requirements, e.g., through allocation of the physical interface's resources between the virtual interfaces. The allocation results in, for example, a first virtual interface being allocated a first share of the bandwidth of the physical interface and a second virtual interface being allocated a second share of the bandwidth of the physical interface.

Figure 2:
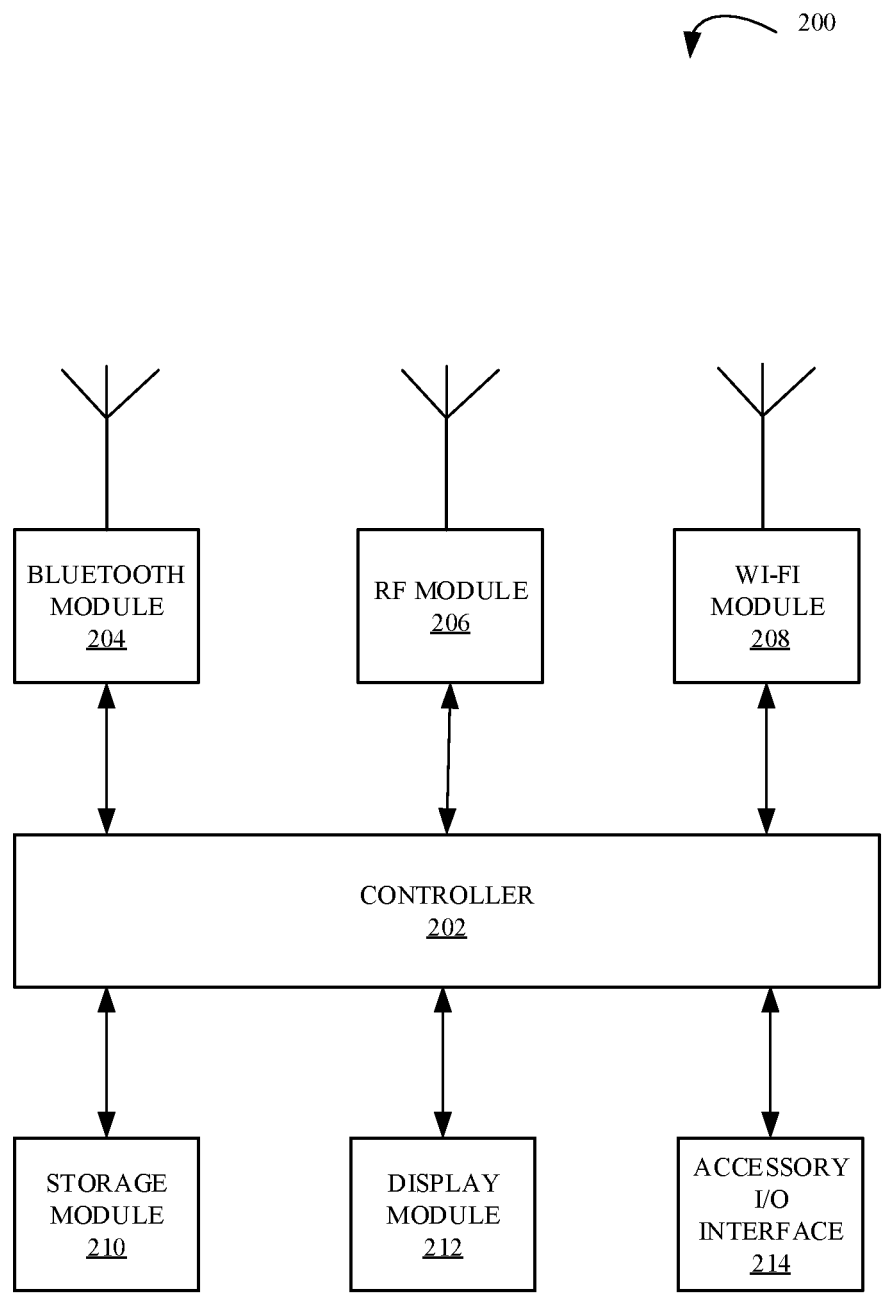
FIG. 2 illustrates an example computing device.

FIG. 2 is a block diagram showing an exemplary portable computing device 200 (e.g., portable computing device 110) according to an embodiment. In one example, portable computing device 200 can include a controller 202, a Bluetooth module 204, an RF module 206, a Wi-Fi module 208, a storage module 210, a display module 212, and an accessory input/output module 214. In some embodiments, portable computing device 200 can include additional modules that are not depicted in FIG. 2, such as global positioning system (GPS) modules, battery modules, motion detection modules, device orientation modules, audio modules, three-dimensional video processing modules, magnetometer modules, three-dimensional gyroscope modules, acceleration detection modules, and/or the like.

In some embodiments, one or more components (e.g., controller 202, Bluetooth module 204, etc.) of portable computing device 200 can be enclosed within a device housing. The device housing can be implemented using any suitable materials, such as plastic, metal, acrylic, glass, wood, etc.

Controller 202, which can be implemented as one or more integrated circuits, can control and manage the overall operation of portable computing device 200. For example, a controller 202 can perform various tasks, such as retrieving various assets that can be stored in storage module 210, accessing the functionalities of various modules (e.g., interacting with other Bluetooth enabled devices via Bluetooth module 204), executing various software programs (e.g., operating systems and applications) residing on storage module 210, transmitting wireless network access credentials, transmitting device identifiers, and so on. In some embodiments, controller 202 can include one or more processors (e.g., microprocessors or microcontrollers) configured to execute machine-readable instructions. For example, controller 202 can include a single chip applications processor. Controller 202 can further be connected to storage module 210 in any suitable manner.

Bluetooth module 204 can include any suitable combinations of hardware for performing wireless communications with other Bluetooth enable devices and allows an RF signal to be exchanged between controller 202 and other Bluetooth enabled devices. In some embodiments, Bluetooth module 204 can perform such wireless communications according to standard Bluetooth Basic Rate/Enhanced Data Rate (BR/EDR) and/or Bluetooth Low Energy (LE) standards. For example, Bluetooth module 204 can include suitable hardware for performing device discovery, connection establishment, and communication based on only Bluetooth LE (e.g., single mode operation). As another example, Bluetooth module 204 can include suitable hardware for device discovery, connection establishment, and communication based on both standard Bluetooth BR/EDR and Bluetooth LE (e.g., dual mode operation). As still another example, Bluetooth module 204 can include suitable hardware for device discovery, connection establishment, and communication based only on standard Bluetooth BR/EDR.

RF module 206 can include any suitable combinations of hardware for performing wireless communications with wireless voice and/or data networks. For example, RF module 206 can include a RF transceiver (e.g., using mobile telephone technology such as GSM or CDMA, advanced data network technology such as 3G or EDGE) that enables a user of portable computing device 200 to place telephone calls over a wireless voice network.

Wi-Fi module 208 can include any suitable combinations of hardware for performing Wi-Fi (e.g., IEEE 802.11 family of standards) based communications with other Wi-Fi enabled devices. For example, Wi-Fi module 208 can include hardware for transmitting and receiving signals over channels associated with 2.4 GHz and 5 GHz bands. Wi-Fi module 208 can be used to establish an infrastructure connection with a network by communicating with a wireless access point. Wi-Fi module can also be used to establish peer-to-peer connections with other devices that have Wi-Fi capability. In some embodiments, Wi-Fi module can also be used to establish a mobile hot-spot in which it provides network connectivity to other wireless devices. Those that are skilled in the art will recognize that one or more modules can be combined into a single module. For example, Bluetooth module 204 and Wi-Fi module 208 can be combined into a single module. In some embodiments, Bluetooth module 204 and Wi-Fi module 208 can also share hardware resources such an antenna for transmitting and receiving signals.

Storage module 210 can be implemented, e.g., using disk, flash memory, random access memory (RAM), hybrid types of memory, optical disc drives or any other storage medium that can store program code and/or data. Storage module 210 can store software programs that are executable by controller 202, including operating systems, applications, and related program code. In some embodiments, storage module 210 can include a suitable set of instructions, executable by controller 202, for establishing several virtual interfaces on a single physical interface and allocating available time slots according to the requirements associated with the virtual interfaces.

Software programs (also referred to as software or apps herein) can include any program executable by controller 202. In some embodiments, certain software programs can be installed on portable computing device 200 by its manufacturer, while other software programs can be installed by a user. Examples of software programs can include operating systems, productivity applications, video game applications, personal information management applications, applications for playing media assets and/or navigating a media asset database, applications for controlling a telephone interface to place and/or receive calls, applications for configuring an accessory for wireless network access, and so on. Certain software programs can provide communication with Wi-Fi infrastructure network and Wi-Fi enabled devices over a peer-to-peer connection.

Display module 212 can be implemented as a CRT display, an LCD display (e.g., touch screen), a plasma display, a direct-projection or rear-projection DLP, a microdisplay, and/or the like. In various embodiments, display module 212 can be used to visually display user interfaces, images, and/or the like. In some embodiments, display module 212 can also be configured to receive input from a user of portable computing device 200. For example, display module 212 can be an LCD-based touch screen. During operation, display module 212 can present graphical user interfaces to a user and also receive inputs (e.g., finger taps) from the user. In other embodiments, additional user interface components (physical buttons, switches, keyboard, etc.) can be provided.

Accessory input/output (I/O) interface 216 can include a number of signal paths configured to carry various signals between portable computing device 200 and an accessory. In one embodiment, accessory (I/O) interface 216 can include a mechanical connector configured to interface with USB, FireWire, or other standard mechanical interface. Alternatively, the mechanical connector can be a proprietary connector such as those used on products manufactured and sold by Apple Inc.

Figure 3:
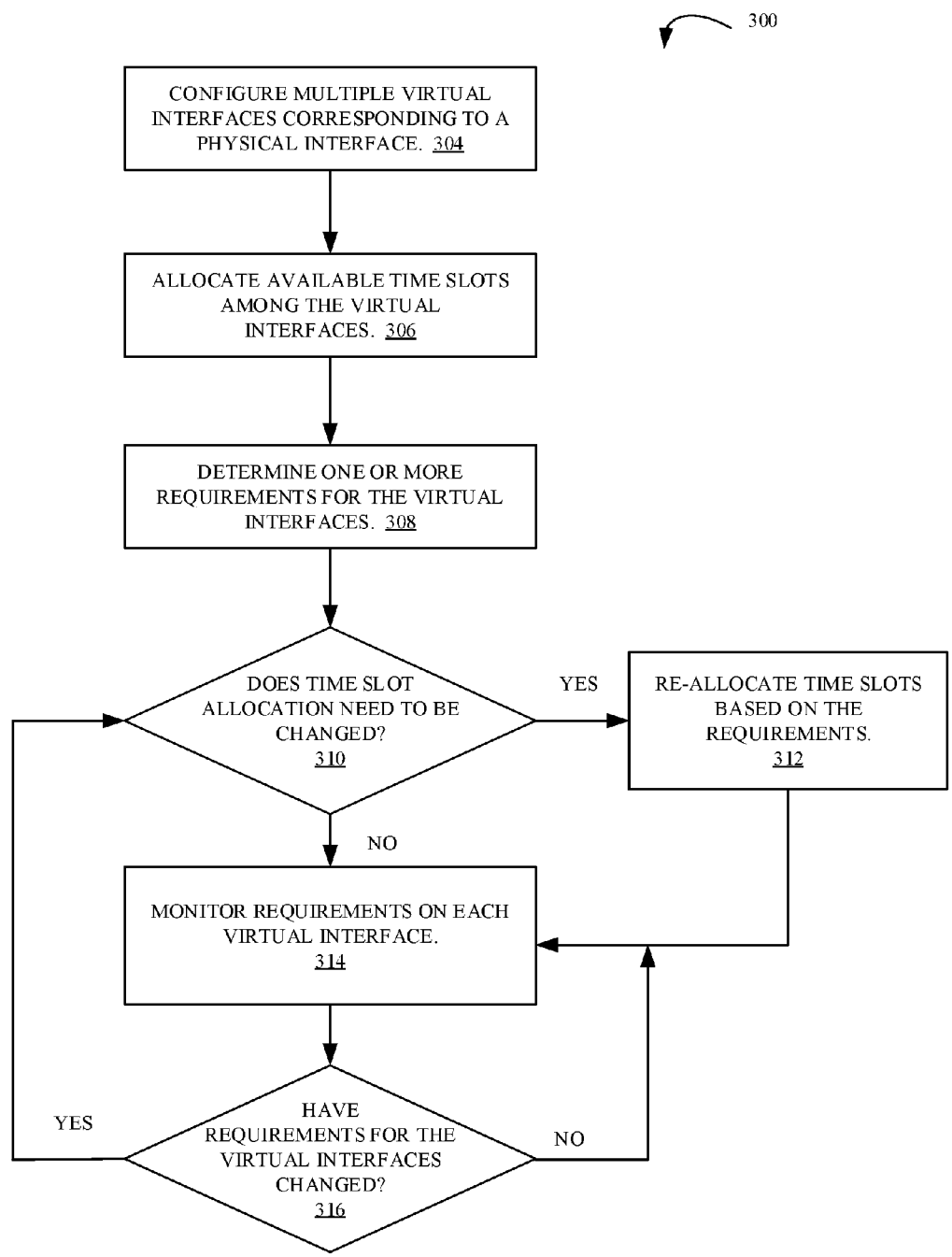
FIG. 3 illustrates an example method embodiment.

Turning now to FIG. 3, an operation of the process for shaping a physical interface to optimize bandwidth utilization among virtual interfaces is disclosed. FIG. 3 is a flowchart of an exemplary method 300. At 304, the client device, an example of which is device 110, configures multiple virtual interfaces corresponding to a physical interface. Examples of a physical interface include a Wi-Fi interface, a Bluetooth interface, an RF interface, etc. Bluetooth is a wireless standard for exchanging data over short distances. In some embodiments, two or more virtual interfaces can be configured to operate on a Wi-Fi interface. For example, a first virtual interface can be configured to manage a Wi-Fi infrastructure connection to a wireless network and a second virtual interface can be configured to manage a peer-to-peer connection to a neighboring device. Each of the two virtual interfaces can utilize the hardware resources provided by the physical Wi-Fi interface. That is, communications (e.g., data and/or signaling) associated with the virtual Wi-Fi infrastructure connection and communications associated with the virtual peer-to-peer connection can be transmitted and received using the physical Wi-Fi interface. The example discussed herein refers to two virtual interfaces, but the present technology is not limited in this manner. Those who are skilled in the art will recognize that the present technology is applicable to any number of virtual interfaces.

At 306, the device can allocate available time slots among the virtual interfaces. In some implementations, the initial allocation of time slots can be based on a default minimum allocation associated with a virtual interface. For example, the device can determine that a virtual interface corresponding to a wireless infrastructure connection requires at least two subsequent slots to function properly. Thus, the initial allocation can assign the minimum two slots to that virtual interface. In some other implementations, the initial allocation of time slots can utilize all available slots in a period for one virtual interface. In still other implementations, the initial allocation of slots can be based on one or more requirements for the virtual interface, as discussed further below. Further, any other scheme can be used for the initial allocation of slots.

In some embodiments, the device can provide access to a channel using a time-division multiplexing scheme. A channel is an instance of a communication medium used for the purpose of passing information. The channel can be divided into any number of slots that make up a particular time period. For example, a time period can consist of eight (8) slots that are 64 milliseconds (ms) long and correspond to a 512 ms period. The device can distribute the bandwidth on the physical interface by allocating one or more of the slots in the time period to each of the virtual interfaces. In some embodiments, the device can dynamically modify the allocation on a time period basis. That is, the determination of time slot allocation for the next time period is made at some time during the current time period (512 ms in the example given above). Alternatively, the device can dynamically modify the allocation of bandwidth on a per slot basis. That is, the allocation for a subsequent slot can be determined during the time of the present slot.

Figure 4:
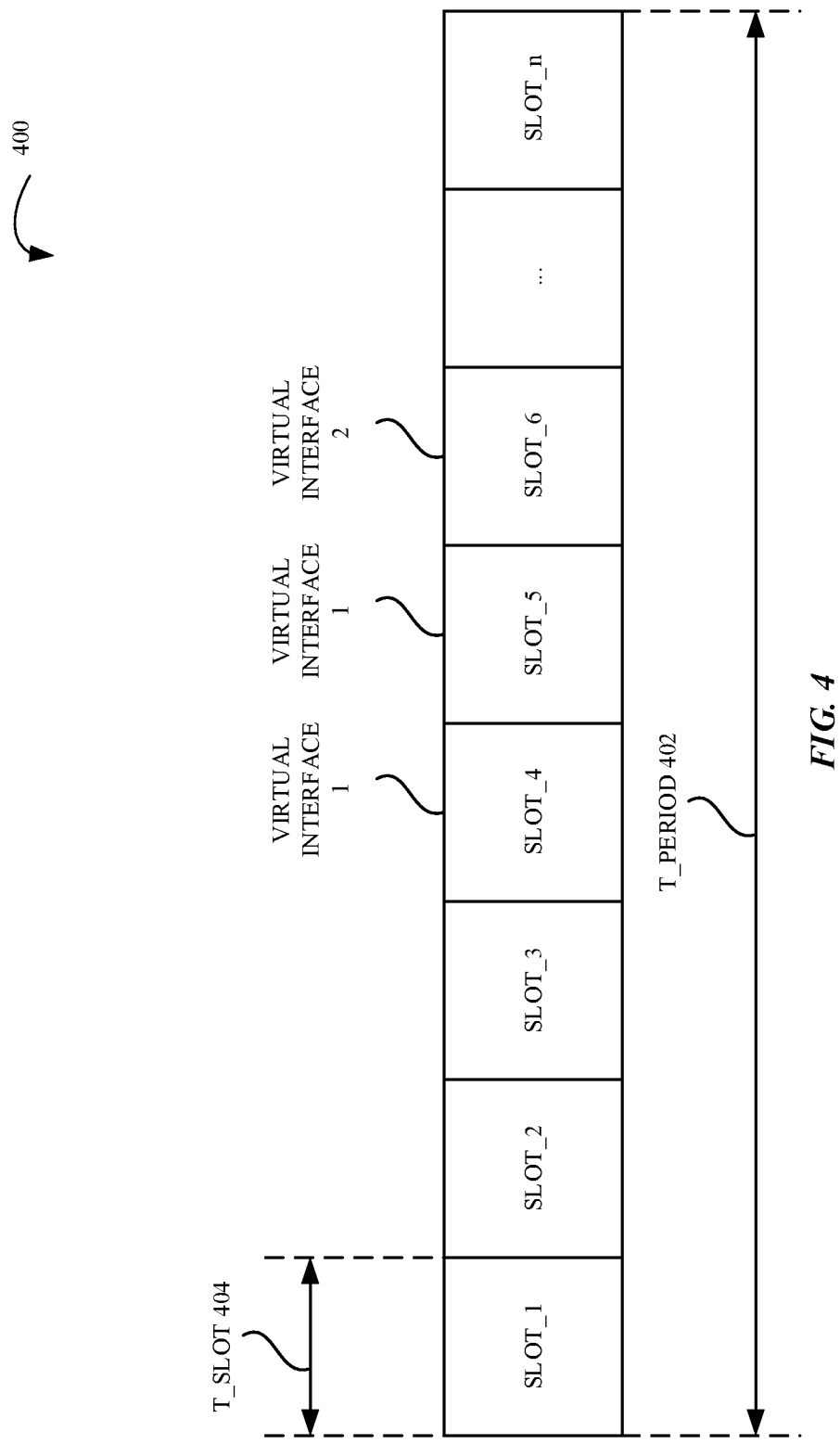
FIG. 4 illustrates an example time slot allocation.

FIG. 4 provides an illustration of time slot allocation for a physical interface. Each time slot, in some embodiments, represents a transmission and/or reception opportunity. FIG. 4 depicts a time period that is T_PERIOD 402 in length and is divided into 'N' number of slots that are each T_SLOT 404 in length. For illustration purposes, SLOT_4 and SLOT_5 are shown as assigned to Virtual Interface 1, and SLOT_6 is shown as assigned to Virtual Interface 2. This allocation of time slots can correspond to a default allocation based on the minimum requirements for each virtual interface. The allocation can be dynamically modified as the requirements for each of the virtual interfaces change. In some embodiments, virtual interface 1 can correspond to a Wi-Fi infrastructure interface and virtual interface 2 can correspond to a peer-to-peer interface. The remaining slots are unassigned and therefore available for use by either of the existing virtual interfaces or by a newly instantiated virtual interface. As illustrated, each of the slots is T_SLOT 404 in length. Alternatively, the duration of a particular slot can be dynamically adjusted based on the requirements of the virtual interface. Further, the slots within T-PERIOD 402 can be configured and assigned in any manner, e.g., consistent with the protocol corresponding to the interface.

Turning back to FIG. 3, at 308 the device can determine one or more requirements for each of the virtual interfaces. A requirement for a virtual interface can be used to intelligently allocate and optimize use of the time slots available on the physical interface. In some embodiments, the requirement can be a threshold number of data packets that are queued for transmission in a transmission buffer. For example, when the number of data packets in the transmission buffer exceeds a particular threshold, the device can determine that additional time slots are required for that virtual interface. In some embodiments, the requirement can be a threshold number of bytes that are queued for transmission in a transmission buffer. For example, when the number of bytes in the transmission buffer exceeds a particular threshold, the device can determine that additional time slots are required for that virtual interface.

In some embodiments, the device can monitor the amount of data packets and/or bytes for a particular trend. For example, rather than using a threshold number to trigger the requirement, the device can monitor the transmission buffer to determine if the number of packets or bytes is increasing or decreasing over a particular time period. Based on the upward or downward trend in the transmission buffer, the device can reallocate available slots to the different virtual interfaces. For instance, at the end of a time period, the device can determine that a virtual interface with two assigned slots reduced its transmit queue by over 50%. In response, the device can determine that the time slots assigned to the virtual interface can be reduced to a single slot, and it can reallocate the newly available slot to another virtual interface.

In another aspect of the present technology, the requirement for the virtual interface can be associated with a particular class of service. For example, the device can determine that a virtual interface is providing 'voice' service and prioritize it over a virtual interface that is providing 'video' service. The device can determine the class of service or the required quality of service (QoS) by examining data packets that carry a particular tag. QoS is the overall performance of a service. For example, QoS in some embodiments, is the performance of the service as seen by a user of the virtual interface. For example, a data packet can be tagged as voice, video, best effort, or background. Based on the tag, the device can determine whether the virtual interface requires more or less time slot allocation. For example, in some embodiments, the tag is a field in a TSPEC field. The TSPEC field, in some embodiments, carries information about the minimum data rate required by an application and also a delay bound. The delay bound, in some embodiments, specifies the maximum amount of time allowed to transport a packet.

In some embodiments, the requirement for the virtual interface can be determined based on interface parameters. For example, an infrastructure wireless interface is required to receive beacon frames that are periodically transmitted by the access point in order to maintain connectivity. Beacons allow a mesh STA to participate in the maintenance of a MBSS. An MBSS is a mesh basic service set. A basic service set (BSS) is a set of STAs that are synchronized. Accordingly, if a beacon frame is expected every 110 ms, a single slot that is 64 ms in length would not be sufficient for the respective virtual interface to always receive the beacon frame. In this example, the device can allocate two subsequent slots totaling 128 ms to ensure that the beacon frame is received. Similarly, establishing and maintaining peer-to-peer connections with neighboring devices can also require minimum time slot allocation. For example, a device may be required to send or respond to a message, e.g., a 'ping,' from an associated peer device in order to maintain peer-to-peer connectivity. Accordingly, the time slot allocation for a virtual interface associated with a peer-to-peer connection can be based on the parameters that dictate the minimum requirements for establishing and/or maintaining the peer-to-peer connection.

In some embodiments of the present technology, the requirement for the virtual interface can be based on a software application that is running on the virtual interface. For example, the device may detect that the iTunes® application is running using the infrastructure wireless network and determine that this application requires a minimum number of time slots in order to function properly. Similarly, the device may detect that the AirPlay® application is running an active mirror session on a peer-to-peer connection and determine that this application requires a minimum number of time slots in order to function properly. In some embodiments, the applications can be whitelisted on the device along with their minimum requirements. Alternatively, the application may support a device query that returns parameters or data that can be used to determine time slot requirements. In some embodiments, the device can run an algorithm that actively learns the requirements associated with a particular application. That is, the device can use historical throughput data to determine minimum and maximum tolerance for a particular application.

After the device determines a virtual interface requirement at 308, it proceeds to 310 to determine if the time slot allocation needs to be changed. A change in time slot allocation may be needed to either improve performance of the virtual interfaces or to meet minimum requirements for a virtual interface. For example, if the virtual interface associated with the infrastructure Wi-Fi connection has a high backlog of data in the transmission queue, the device can allocate additional available slots to Wi-Fi infrastructure to help alleviate the backlog. In some instances, if there are no frames available, the device can prioritize a virtual interface by reallocating slots from one virtual interface to another. For example, a period may include 8 slots that are divided equally among two virtual interfaces. In response to detecting a requirement for additional time slots on the infrastructure Wi-Fi virtual interface, the device can reallocate one or more of the slots from the peer-to-peer virtual interface to the Wi-Fi interface. In a high demand situation, it is possible that the time slots available on the physical interface are insufficient to adequately support multiple virtual interfaces. In response, the device can throttle the data throughput or it can output a message that informs the device user that a particular interface is no longer available.

In response to determining that time slot allocation needs to be changed, the method can proceed to 312 where it reallocates time slots according to the requirements for each virtual interface. As discussed above, the reallocation of time slots can be done dynamically, on a real-time basis. Alternatively, the reallocation of time slots can be revisited at pre-determined time intervals that correspond to a particular number of time slots. Any scheme for reallocating slots can be used, including dynamic reallocation and the use of one or more predefined profiles, which can define the number and distribution of slots allocated to the virtual interfaces within a time period. A configuration profile, in some embodiments, is a collection of parameters that represent a current or available configuration of a device or STA.

In some embodiments, changes to the time slot allocation can be made in minimum steps to provide hysteresis to the system. For example, a particular virtual interface can be allocated 75% of the slots in a time period and the device can detect that the interface has gone into standby mode and no longer requires this many slots. In response, the device can reallocate the slots in consecutive 'n' number of time periods until the interface reaches its minimum requirement. Alternatively, the device may intelligently reallocate large amounts of slots based on predetermined criteria. Using the same example, the device may recognize that the standby mode of the virtual interface will last for a minimum of 10 time periods. In response, the device can immediately reallocate most of the time slots to another virtual interface until the 10 time periods have expired.

In some embodiments, a change in requirements for a virtual interface can also encompass and account for a change in the channel utilized by the physical interface. For example, a physical Wi-Fi interface can operate in the 2.4 GHz and 5 GHz bands, when supported by the network. Thus, a particular time slot can have greater bandwidth if it is associated with the 5 GHz band rather than the 2.4 GHz band. Accordingly, the device can determine the data throughput based on the time slots and the frequency in order to determine proper time slot allocation.

In some embodiments, wherein the physical interface is operating in both the 2.4 GHz and 5 GHz bands, time slot allocation can take into account the combined bandwidth and quality of service criteria. For example, when the available bandwidth of the physical interface on one channel is exceeded, an application or service can have its bandwidth split across both the 2.4 GHz and 5 GHz bands. The present technology can take into account quality of service criteria when selecting the application or service to have its bandwidth split across the bands. In general, the application or service having the greatest tolerance for higher latency is a better choice for using both bands. In some embodiments, splitting or distributing bandwidth includes channel hopping between two frequency channels. In some embodiments, simultaneous transmission on two different channels is performed.

In some embodiments, a switch between channels can be performed in advance of a subsequent time slot. For example, the device can provide priority to a virtual interface corresponding to a Wi-Fi infrastructure network on the 5 GHz band by initiating the band transition from 2.4 GHz to 5 GHz during a previous time slot corresponding to a peer-to-peer virtual interface. That is, the peer-to-peer time slot can be shortened by the amount of time it takes to transition between bands. Consequently, the favored virtual interface can utilize its entire time slot without having to account for the time it takes to transition to its corresponding band. Similarly, a virtual interface can be prioritized by postponing a band transition to the subsequent time slot. For example, a band transition that is required for a time slot assigned to a peer-to-peer virtual interface that follows a prioritized Wi-Fi infrastructure time slot can be initiated inside of the assigned peer-to-peer time slot, rather than in advance of the assigned peer-to-peer time slot. In some embodiments, some services are restricted to a particular band. For example, Bluetooth utilizes the 2.4 GHz band. In some embodiments, some services can utilize either band, but prefer a particular band. For example, a peer-to-peer networking protocol such as Apple Wireless Direct Link (AWDL) most commonly utilizes the 5 GHz band. In some embodiments, a peer-to-peer link is a direct link within a BSS.

In some embodiments, the reallocation of time slots can be according to a preference hierarchy. It may be that the requirements for each application and thereby the requirements for the virtual interface each application is communicating over can result in conflicting priorities. For example, one application might require a high quality of service, another application can have a large number of bytes in a queue, and another application can have a large number of packets in a queue. In such embodiments, the present technology can make decisions regarding the allocation of time slots according to a priority structure. For example a quality of service criteria can have a highest priority, followed by an amount of queued bytes, followed by a number of queued packets.

Returning to FIG. 3, if the allocation does not need to be changed at 310, or after the reallocation at 312, the method proceeds to 314 where the device monitors the requirements for each virtual interface. For example, the device continues to monitor any or all of the bytes or frames in the transmission buffer, the applications that are running on each virtual interface, the quality of service requirements associated with each virtual interface, the connectivity parameters (e.g. beacon reception, peer-to-peer pings) etc. In addition, the device may detect a change unrelated to the virtual interfaces, such as activation of a Bluetooth session on the device. In some instances, Bluetooth can share the same frequency and/or physical interface (e.g. 2.4 GHz) as the Wi-Fi physical interface. Accordingly, activation of a Bluetooth session can also trigger a need to reallocate time slots among the virtual interfaces.

At 316, if none of the requirements for the virtual interfaces has changed, the method continues to monitor the requirements (314). Alternatively, if a change is detected at 316, the method returns to 310 to determine if the time slots need to be reallocated. Based on the particular change detected, the device can reallocate time slots as discussed above and continue to monitor the virtual interfaces.

Figure 5:
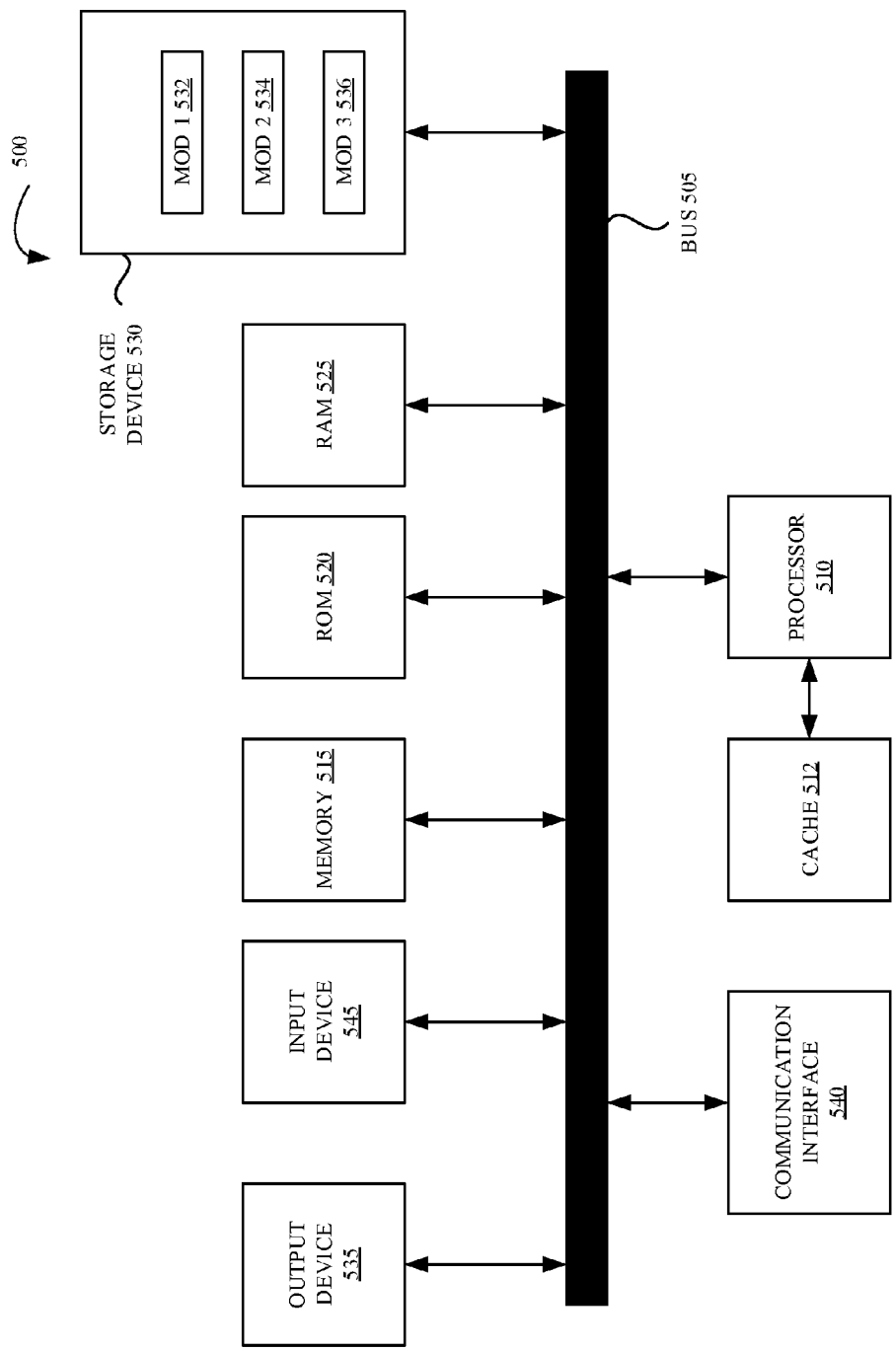
FIG. 5 illustrates example system embodiments.

FIG. 5 illustrates an example possible system embodiment. Persons of ordinary skill in the art will also readily appreciate that other system embodiments are possible.

FIG. 5 illustrates a system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   configuring a first virtual interface and a second virtual interface on a physical wireless interface, each virtual interface having an initial allocation of a plurality of time slots in a period;
   balancing a physical wireless interface bandwidth between the first virtual interface and the second virtual interface based on a first requirement for a first application using the first virtual interface and a second requirement for a second application using the second virtual interface; and
   adjusting, responsive to the balancing, the initial allocation of the plurality of time slots, wherein:
   one or more additional time slots from the plurality of time slots on the physical wireless interface are allocated to the first virtual interface based on meeting minimum requirements for the first application using the first virtual interface, and
   the first application using the first virtual interface is prioritized over the second application using the second virtual interface.

2. The method of claim 1, wherein the first requirement comprises at least one of a number of data packets in a transmission buffer or a number of bytes in the transmission buffer, the data packets or bytes being generated by the first application for transmission via the first virtual interface.

3. The method of claim 1, further comprising:
   detecting that the first application is using the first virtual interface, wherein the first requirement is provided by the first application and specifies a minimum number of contiguous time slots required for reception of beacon frames to maintain connectivity via the first virtual interface with an infrastructure access point.

4. The method of claim 1, further comprising:
monitoring one or more data packets for the first application using the first virtual interface; and
determining the first requirement based on a quality of service tag associated with at least one of the one or more data packets, the quality of service tag comprising information about a minimum data rate required by the first application and a maximum amount of time allowed to transport the at least one of the one or more data packets.

5. The method of claim 1, wherein the balancing further comprises monitoring i) a first buffer length, ii) a first traffic minimum data rate, and/or iii) a first traffic burstiness, wherein the first buffer length, the first traffic minimum data rate, and the first traffic burstiness are associated with the first virtual interface.

6. The method of claim 5, wherein the first virtual interface corresponds to an infrastructure Wi-Fi network interface and the second virtual interface corresponds to a peer-to-peer connection.

7. The method of claim 6, wherein the adjusting further comprises switching between a first frequency band used for communication via the second virtual interface and a second frequency band used for communication via the first virtual interface.

8. The method of claim 7, wherein the switching includes shortening a time slot used for the peer-to-peer connection to accommodate transition from the first frequency band to the second frequency band before time slots used for communication via the infrastructure Wi-Fi network interface.

9. A non-transitory computer-readable storage medium having stored thereon instructions which, when executed by a processor, cause the processor to:
allocate a first set of time slots from a plurality of time slots to a first virtual interface and a second set of time slots from the plurality of time slots to a second virtual interface, wherein the plurality of time slots correspond to transmission and reception opportunities using a physical wireless interface;
obtain a first requirement for a first application using the first virtual interface; and
allocate, based on the first requirement, one or more remaining time slots from the plurality of time slots on the physical wireless interface to the first set of time slots allocated to the first virtual interface,
wherein the first requirement comprises a minimum data rate for the first application using the first virtual interface.

10. The non-transitory computer-readable storage medium of claim 9, wherein the first requirement comprises a class of service requirement that includes at least one of video, audio, best effort, and background.

11. The non-transitory computer-readable storage medium of claim 9, wherein first requirement further comprises a number of data packets in a transmission buffer or a number of bytes in the transmission buffer, the data packets or bytes being generated for the first application for transmission via the first virtual interface.

12. The non-transitory computer-readable storage medium of claim 9 having stored thereon additional instructions which cause the processor to:
after the allocation of the one or more remaining slots, detect a change in the first requirement corresponding to a decrease in demand by the first application for the plurality of time slots; and in response, allocate at least a portion of the first set of time slots to the second virtual interface for use by a second application.

13. The non-transitory computer-readable storage medium of claim 9, wherein the first virtual interface corresponds to an infrastructure Wi-Fi network interface and the second virtual interface corresponds to a peer-to-peer connection.

14. The non-transitory computer-readable storage medium of claim 13 having stored thereon additional instructions which cause the processor to:
switch between a first frequency band used for communication via the second virtual interface and a second frequency band used for communication via the first virtual interface, and
shorten a time slot used for the peer-to-peer connection to accommodate transition from the first frequency band to the second frequency band before time slots used for communication via the infrastructure Wi-Fi network interface.

15. A client device comprising:
a processor;
a physical wireless interface; and
a computer readable medium, having stored thereon a plurality of instructions that when executed cause the processor to:
configure a first virtual interface and a second virtual interface on the physical wireless interface having a plurality of time slots;
determine first and second shares of a physical wireless interface bandwidth based on i) a first requirement for a first application using the first virtual interface, and ii) a second requirement for a second application using the second virtual interface, wherein the first share comprises two or more time slots based on meeting minimum requirements for the first application using the first virtual interface; and
allocate the first share to the first virtual interface and the second share to the second virtual interface,
wherein the first application using the first virtual interface is prioritized over the second application using the second virtual interface.

16. The client device of claim 15, wherein the physical wireless interface is configured to communicate on a first channel and a second channel, and the plurality of time slots are distributed across the first channel and the second channel, and
wherein at least one of the two or more time slots allocated to the first virtual interface is for the first channel.

17. The client device of claim 15, wherein the first virtual interface corresponds to an infrastructure Wi-Fi network interface and the second virtual interface corresponds to a peer-to-peer connection.

18. The client device of claim 15, wherein the first requirement comprises at least one of a number of data packets in a transmission buffer or a number of bytes in the transmission buffer, the data packets or bytes being generated by the first application for transmission via the first virtual interface.

19. The client device of claim 15, wherein the instructions further cause the processor to:
estimate a trend with time of a queue length of a transmission buffer to produce an estimated trend, wherein the first transmission buffer is associated with the first virtual interface; and
update the first share based on the estimated trend.

20. The client device of claim 15, wherein i) the first requirement is based on a quality of service tag and ii) the quality of service tag corresponds to at least one of a video application or an audio application.

* * * * *